United States Patent [19]

Busson et al.

[11] Patent Number: 4,738,769

[45] Date of Patent: Apr. 19, 1988

[54] PROCESS FOR CONVERTING LIQUID OR SEMI-LIQUID HYDROCARBON CHARGES TO LIGHTER FRACTIONS

[75] Inventors: Christian Busson, Dardilly; Jacques Alagy, Charbonnieres; Jean-Paul Euzen, Dardilly; Pierre Galtier, Vienne Estressin, all of France

[73] Assignee: Institut Francais Du Petrole, Rueil-Malmaison, France

[21] Appl. No.: 478,428

[22] Filed: Mar. 24, 1983

[30] Foreign Application Priority Data

Mar. 24, 1982 [FR] France ............................. 82 04981

[51] Int. Cl.$^4$ ............................................. C10G 9/28
[52] U.S. Cl. .................................... 208/127; 208/126; 208/167; 208/176
[58] Field of Search ..................... 208/127, 126, 167

[56] References Cited

U.S. PATENT DOCUMENTS

| | | | |
|---|---|---|---|
| 2,680,706 | 6/1954 | Kilpatrick | 208/126 |
| 2,766,187 | 10/1956 | Bergstrom | 208/167 |
| 2,770,583 | 11/1956 | Haddad | 208/167 |
| 2,846,373 | 8/1958 | Schutte | 208/126 |
| 2,868,719 | 1/1959 | Martin et al. | 208/127 |
| 2,910,427 | 10/1959 | Cabbage | 208/126 |
| 2,935,466 | 5/1960 | Schoenmakers | 208/176 |
| 2,952,623 | 9/1960 | McClure | 208/167 |
| 3,708,552 | 1/1973 | Kuall et al. | 208/127 |
| 3,752,658 | 8/1973 | Blaser | 208/127 |

Primary Examiner—William R. Dixon, Jr.
Assistant Examiner—Cynthia A. Prezlock
Attorney, Agent, or Firm—Millen & White

[57] ABSTRACT

A process for converting liquid or semi-liquid hydrocarbon charges to lighter fractions comprises a first step (a) heating droplets jets of the charge introduced into a pyrolysis chamber by surrounding them with parallel jets of hot solid particles, of relatively large size, of a heat carrier material, not substantially in contact with the droplet jets, so as to maintain a temperature of 700°–1600° C., and introducing a gas so as to obtain a pressure from 1 to 150 bars. A second step involves (b) separating the gaseous fraction from the solid particles. Thereafter (c) at least a portion of the solid particles are heated and fed back to step (a). The gaseous fraction is (d) cooled by means of a cold gas so as to recover light hydrocarbons therefrom.

13 Claims, 2 Drawing Sheets

PROCESS FOR CONVERTING LIQUID OR SEMI-LIQUID HYDROCARBON CHARGES TO LIGHTER FRACTIONS

BACKGROUND OF THE INVENTION

The invention concerns a process for thermal treatment of liquid or semi-liquid hydrocarbon charges, in order to convert them to lighter gaseous or liquid products. The process makes use of a reactor with an ultra-short residence time providing for a high and very quick thermal transfer between a heat carrier and said hydrocarbons.

A process for the steam-cracking of oil fractions is already known (B. P. Ennis, H. B. Boyd, R. Orris—Chemtech, November 1975, p. 693), but this process remains limited to:

the treatment of light hydrocarbon charges, in order to avoid substantially high coke deposits on the reactor walls, the treatment at relatively moderate temperature since the mechanical strength of the tubes requires a temperature not in excess of 900° C.

Another technique of thermal cracking under pressure in the presence of hydrogen (French Pat. No. 2,164,450) makes it possible to direct the reactions to a production of light olefins preferentially to that of the corresponding saturated hydrocarbons. The selectivity to olefins results from the use of moderate temperatures (625° to 900° C.) and of a short residence time (0.01 to 0.1 s).

However, this type of process, as a result of the practical limitations concerning the temperature and the residence time, cannot be applied to heavy fractions containing aromatic hydrocarbons.

For the treatment of heavy hydrocarbon charges, the heat transfer through tubes being no longer possible, the heat supply may be effected by intimate contact between solid particles brought to high temperature and the charge sprayed in a fluidized bed (U.S. Pat. No. 3,855,070).

These techniques have the disadvantages of favouring the formation of tars and the agglomeration of the particles to the prejudice of the reaction yield.

SUMMARY OF THE INVENTION

The process of the invention has as an object to cope with the defects of the conventional processes and to enlarge their field of application. Particularly, it has as an object to favour the cracking reactions leading to the formation of gaseous and liquid hydrocarbons of low viscosity, at the cost of a reduced coking reaction. Moreover, in this new process, the formed coke no longer tends to be fixed on the walls. This is obtained by effecting a better dispersion of the carbonaceous material in the pyrolysis chamber, by increasing the temperature very quickly (very short residence time) in said zone, while proceeding at higher thermal levels than in the conventional processes, and by favouring the thermal transfers by radiation preferably than by conduction or convection, the exchange being effected directly with a solid heat carrier and not through a wall.

Being thus free of coke deposits on the tubes walls and of agglomeration of particles by formation of tars, it is possible, on the one hand, to obtain higher yields and selectivities during the treatment of light charges and, on the other hand, to similarly convert very heavy charges which cannot be converted by the conventional processes.

These various advantages are obtained as follows:

(a) In a first step, the liquid or semi-liquefied hydrocarbon material is introduced into a pyrolysis chamber in the form of a plurality of downward jets of droplets, and hot solid particles of a heat carrying material of a relatively large particles size are introduced into the same chamber as downwardly directed jets, parallel to the jets of droplets but without substantial contact therewith, at least in the upper part of the chamber, the temperature and the flow rate of the jets being so adjusted as to maintain an average temperature from 700° to 1600° C. within said chamber, the pressure in said chamber being comprised between the atmospheric pressure and 150 bars.

(b) In a second step, the effluent from step (a) is separated into a fraction of solid particles and a gaseous fraction containing hydrocarbons without substantially cooling said effluent of step (a).

(c) In a third step, at least a portion of the fraction of solid particles is heated and fed back to step (a) as heat carrier.

(d) In a fourth step, the gaseous fraction containing hydrocarbons is cooled down by means of a relatively cold gas whose composition is identical to or different from that of the gas already introduced in the reaction chamber.

It is then possible to conventionally treat the product from step (d) to purify it or to separate therefrom the produced normally liquid or gaseous hydrocarbons.

Eventually, according to the case, at least a portion of the fraction of solid particles (these particles contain a substantial proportion of carbon) may be treated with oxygen and steam to produce a hydrogen-containing reducing gas which can be used, at least partly, according to the case, in step (a).

According to a preferred operating manner, in the second step only the solid particles of relatively large size are separated and only these latter particles are treated in the third step. In such a case, the gaseous fraction supplied to the fourth step still contains solid particles of small size: after cooling in the fourth step an additional separation of the gaseous fraction from the solid particles of small size is effected. These latter particles are then preferentially used to produce a reducing gas by treatment with oxygen and steam.

By solid material of relatively large particle size, it is meant particles of a heat-resisting inorganic substance, for example alumina, silica, an aluminate, a silicate or, preferably, coke. The average particle size is at least 25 $\mu$m, for example from 50 to 100 $\mu$m. By coke, it is meant coal coke or oil coke properly, as well as pitch. The fine particles have an average size smaller than 25 $\mu$m, for example from 5 to 15 $\mu$m. They always contain a substantial proportion of coke.

The gas injected in the reaction zone may contain steam, and optionally, hydrogen when it is desired to produce olefins by steam cracking.

It may contain relatively pure hydrogen or a synthetic gas comprising both hydrogen and carbon monoxide when it is desired to produce a combustible gas of high methane content by hydropyrolysis. When a conventional thermal cracking is to be effected, an inert gas (nitrogen or light saturated hydrocarbons) can be used.

The liquid or semi-liquid charge consists essentially of liquid or semi-liquid hydrocarbons, with the exclusion of solid products or products issued from the coal liquefaction.

Possible liquid charges are exemplified below non-limitatively:

light or middle hydrocarbon fractions from the category of naphthas and gas-oils, the latter being produced either by straight-run distillation of crude oils or by conversion of heavier hydrocarbons;

heavy hydrocarbon oils obtained by extraction from bituminous shales or asphaltic sands;

very heavy and very viscous crude oils containing a high proportion of asphaltenes, resins and or metals;

heavy distillation residues of oil products;

asphalts obtained from a residue deasphalting under vacuum;

heavy residues from the conversion of oil products;

hydrocarbon by-products of the coal, oil and gas industries, such as tars, asphalts, tar pitches.

This charge is introduced into the pyrolysis chamber by spraying, for example by driving it by means of a reacting or nonreacting gas through an injector. There is thus obtained fine droplets of a diameter as small as 20 μm.

The residence time of the droplets in the pyrolysis chamber is from about 1 to 500 milliseconds, preferably from 1 to 50 milliseconds. The particular heating mode of the jets of droplets by parallel jets of hot solids makes it possible to increase very quickly the temperature, thus favoring the cracking reaction to the prejudice of the coking reaction. The solids are admitted at a very high temperature, about 800° to 1600° C., preferably 1100° to 1400° C.

DETAILED DISCUSSION OF THE INVENTION

Figure 1:
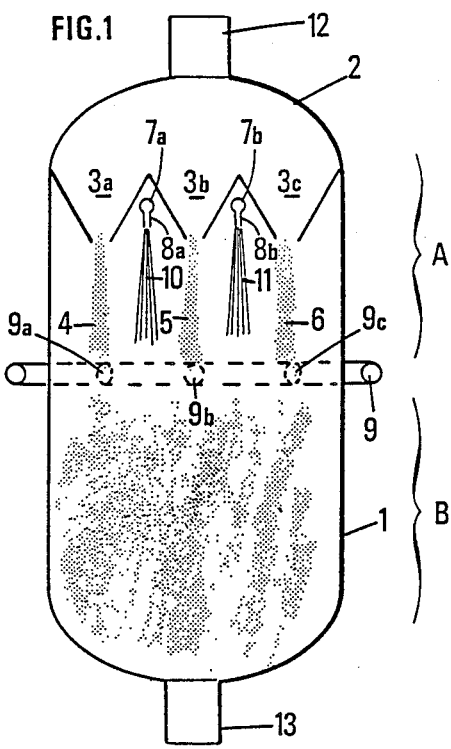
FIG. 1 schematically illustrates, in cross-section, a preferred embodiment of a chamber for conducting the process of the invention.

According to a preferred embodiment, each jet of droplets is surrounded by a curtain of hot solid particles, as shown in the cross-sectional view of FIG. 1.

In order to obtain the highest possible heat exchange, it is preferred to multiply the number of solid jets and of liquid injection nozzles for a given capacity. It is thus preferred to make use of a pyrolysis chamber comprising a large number of injection nozzles, each of them injecting a beam of droplets surrounded by a close curtain of solid particles in gravitational flow. It is important that the size of the droplets be as small as possible in order that the heat exchange process be not slowed down by the thermal diffusion from the outside to the inside of the droplet. FIG. 1 shows an embodiment of this chamber with alternate spraying nozzles and curtains of solid particles.

Although the heat exchange is essentially effected by radiation, the participation in the heat transfer of other forms of heat exchange, by conduction and/or convection, is by no way excluded. However, the heat exchange by radiation is still preferred since, at least during the first milliseconds, agglomerates are likely to be formed in case of direct contact between the droplets and the solid particles.

By adapting the respective flow rates of hot solid carrier and of the charge, the temperature of the charge is brought from about 300°–400° C. to about 700° C. or above in a few milliseconds, preferably less than 50 milliseconds, taking into account the heat required for the cracking and the evaporation of the volatile materials either initially present or formed by cracking.

In order to control the gaseous phase reaction, it may be advantageous to inject another part of the gas in the intermediary portion of the pyrolysis chamber. The solids and particularly the coke, used as heat carrier, remain inert with respect to the gas under these operating conditions. The coked portion of the charge will come in addition to the coke heat carrier.

In the second part of the reactor, the high heat transfer being no longer necessary and the dangers of agglomeration being averted, the solid heat carrier and the different reactants and reaction products may become admixed by the swirling of the medium.

FIG. 1 is a cross-sectional view of the pyrolysis furnace 1 along a vertical plane. This furnace comprises a zone 2 for receiving hot coke particles conveyed from a furnace through line 12. These particles are supplied through orifices such as 3a, 3b, 3c so as to form curtains (4, 5, 6) of particles. Each curtain is interposed between jets (10, 11) of atomized liquid, issued from a series of injectors such as 8a and 8b, placed on feed lines such as 7a, 7b.

The gas required for controlling the reaction temperature is injected through a series of nozzles on the coaxial external line 9. This series of cold gas injection nozzles (9a, 9b, 9c) defines the limit between an upper zone A where it is preferred to reduce the turbulence, and a lower zone B. The products are discharged through line 13. The residence time in the non-turbulent zone (A) is preferably from 1 to 50 milliseconds bringing the charge to about 700°–1200° C.; in the turbulent zone B the residence time is preferably from 20 to 480 milliseconds and the average temperature preferably of 700°–1200° C.

At the outlet of the reactor, the mixture of solid and gaseous products is conveyed to a phase separation device formed of a cyclone assembly. In a first hot-operated cyclone the major part of the large size particles is recovered.

At the output of said first cyclone, the gaseous phase driving therewith the smaller particles or "fines" is quenched by injection of cold gas and the whole is fed to the input of a second cyclone wherefrom are recovered, on the one hand, the gases to be treated and, on the other hand, the small particles. The quench brings the temperature preferably below 400° C.

When the selected reaction requires a hydrogen-containing reducing gas, the flow formed of small coke particles is conveyed to an oxyvapogasification reactor of conventional type so as to produce a gas containing $CO + H_2$; this reactor is optionally followed with a CO conversion reactor for producing hydrogen. When the amount of small coke particles issued from the second cyclone is insufficient to produce the sufficient amount of hydrogen or of $CO + H_2$ mixture required for the process, a portion of the flow of the large particles issued from the first hot cyclone is also fed to the oxyvapogasification reactor. An additional production may be considered, in view of feeding, for example, a methanol production unit.

The main flow of large particles issued from the first hot cyclone is conveyed to a heating furnace where it is brought to about 1000° to 1600° C. This furnace is preferably formed of an enclosure equipped on its periphery with radiant burners with flat flame. In front of the burners, the solid falls as a dropping curtain. The radiant burners of the preheating furnace are preferably fed with a portion of the change to be treated and with oxygen or air, although other combustion agents may be used. At the bottom of the furnace the heated solid is conveyed to the pyrolysis reactor. The combustion gases may advantageously be used as driving gas up to the solid particles injectors and beyond.

In a preferred embodiment, the pyrolysis reactor is located below the heater.

Figure 2:
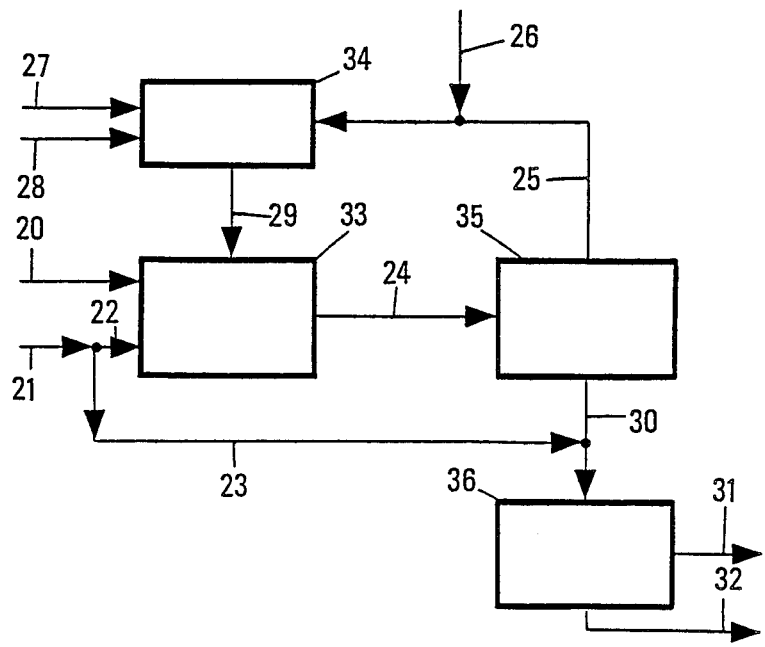
FIG. 2 is a box diagram illustrating conducting one embodiment of the process of the invention.
Figure 3:
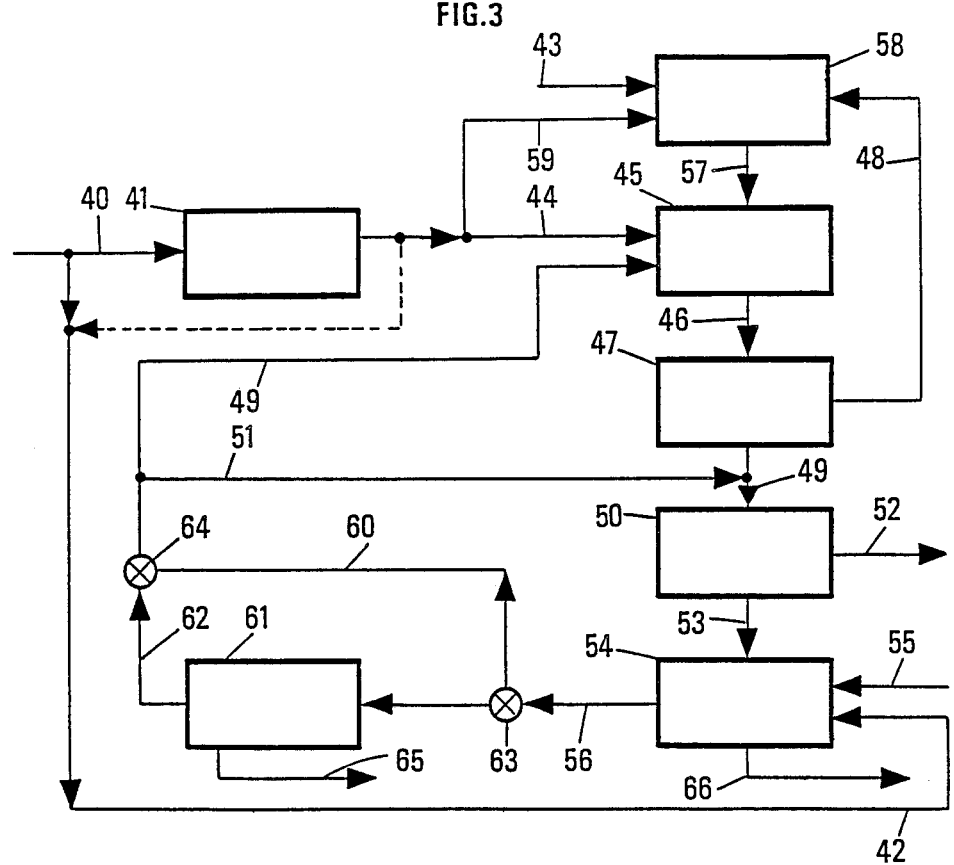
FIG. 3 is a box diagram illustrating an alternative embodiment of conducting the process of the invention.
Figure 4:
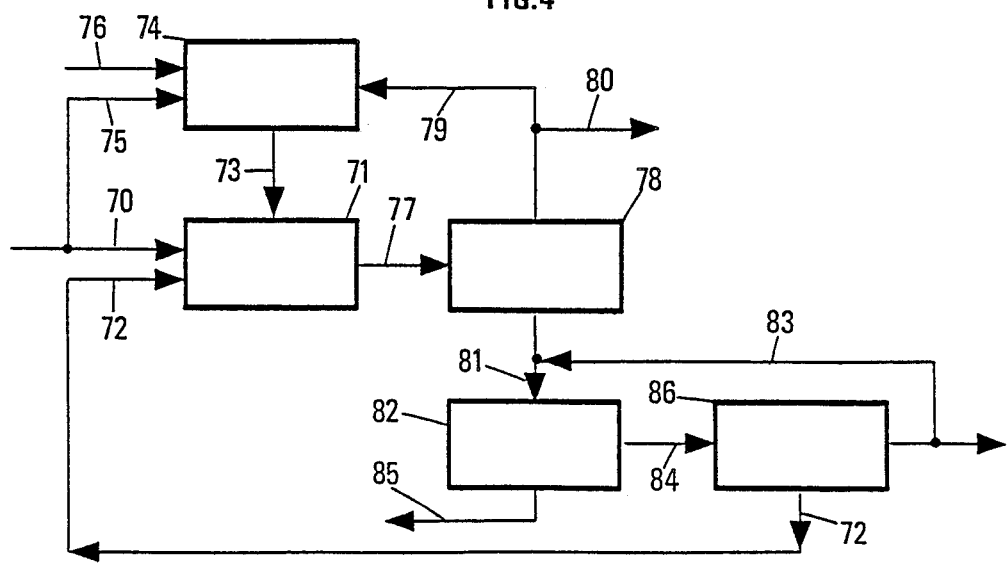
FIG. 4 is a box diagram illustrating still another embodiment of conducting the process of the invention.

Three alternative embodiments of the process of the invention, illustrated by the diagrams of FIGS. 2, 3, 4 are given below by way of nonlimitative examples.

(1)

Example of olefins production by naphtha steam-cracking

In FIG. 2, naphtha is introduced through line 20, as liquid, into the steam-cracking reactor 33. This reactor also receives steam from lines 21, then 22, as well as coke particles at 1400° C. issuing, through line 29, from furnace 34. The operating conditions are 1150° C. as an average and 0.15 MPa, dilution rate by steam 0.5, residence time in zone A of the reactor 20 ms and in zone B 100 ms.

The coke is heated in furnace 34, for example, by combustion of heavy fuel No. 2 (fed through line 27) by means of air in slight defect (fed from line 28). The soot generated by this sub-stoichiometrical combustion will be recovered in the second cyclone 36 of the process. The effluent from reactor 33 is fed through line 24 to cyclone 35 for separating therefrom the solid particles of larger size (average size of about 50 $\mu$m). The latter are conveyed through line 25 to furnace 34 to be heated therein and are then used as heat carrier in reactor 33. An additional coke amount with particles of an average diameter of 50 $\mu$m is effected through line 26. The temperature of cyclone 35 is substantially the same as that of the steam cracking reactor 33, i.e. 1150° C. The gas and the finest solid particles are fed through line 30 to a second cyclone 36 after having been cooled by steam, fed through line 23. Gas (line 31) and very fine solid particles of an average size smaller than 25 $\mu$m (line 32) are thus separated at about 350° C. These very fine particles consist of soot resulting from the combustion of the heavy fuel and from the coke heat carrier attrition.

The produced gases discharged from line 31 contain the desired olefins and are fractionated and purified in a known manner.

The obtained yields are the following (% by weight):

| | |
|---|---|
| $CH_4$ | 16.8 |
| $C_2H_4$ | 39.5 |
| $C_3H_6$ | 10.3 |
| $C_4H_6$ | 5.2 |
| Acetylenics | 0.4 |
| $C_5$ and heaviers | 27.8 |
| | 100 |

(2)

Example of methane production by asphalt hydropyrolysis

The characteristics of the asphalt charge are given below:
Specific gravity at 15° C.: 1.029
Viscosity at 100° C.: 3250 cP (3.25 Pa.s)
Viscosity at 150° C.: 215 cP (0.215 Pa.s)
Asphaltenes: 10.8%
Conradson carbon: 20.9%
Softening point: 47° C.
Penetration point: 86° C.

In the embodiment of FIG. 3, the crushed asphalt is introduced through line 40 into the melting furnace 41 to be brought to 400° C. so as to liquefy the asphalt and make it easily transportable. This liquid is fed through line 44 to the methanation reactor 45. The latter also receives the reducing gas, hydrogen or a $H_2+CO$ mixture (line 49), as well as coke particles at 1400° C. through line 57 from furnace 58.

The operating conditions in reactor 45 are:
Total pressure: 80 bars
Average temperature: 900° C.
Residence time in zone A of the reactor: 5 milliseconds
Residence time in zone B: 200 milliseconds The furnace 58 is heated by combustion of any fuel or advantageously by combustion of a portion of the asphalt charge itself (line 59).

Preferentially, the combustion-containing agent is oxygen, fed through line 43. The effluent from reactor 45 is fed through line 46 to the first cyclone 47 for separating the larger solid particles. The latter are fed through line 48 to furnace 58 where they are heated and then used as heat carrier in reactor 45. The temperature of cyclone 47 is substantially the same as that of furnace 45. The cyclone may thus be placed directly below the furnace 45, just at the output thereof. The gases and the smaller solid particles are fed through line 49 to a second cyclone 50. Relatively cold hydrogenating gas (line 51) has been previously admixed thereto. There is thus separated gases (line 52) and relatively fine solid particles (line 53). The gases contain the desired methane as well as heavier hydrocarbons, for example ethane, light aromatic hydrocarbons (benzene, toluene, xylenes) and optionally heavier hydrocarbons. Less desirable gaseous products such as $H_2S$, CO and $CO_2$, are also present. These gases may be fractionated and purified in a known manner.

The carbonaceous solid particles from line 53 are fed to the gasification reactor 54. The latter is of conventional type and receives oxygen and steam (line 55). Liquefied asphalt is added through line 42 in order to produce the $H_2$-containing gas required for the methanation. The reaction between the carbonaceous particles, oxygen and steam generates a gas containing CO, $CO_2$ and $H_2$ (line 56). This gas may be directly supplied, through lines 56 and 60, to lines 49 and/or 51. It may also be treated in unit 61 for converting CO to $CO_2$ and removing the latter. The obtained relatively pure hydrogen is then fed through line 62 to lines 49 and 51. Through valves 63 and 64, the desired conveying path is selected. Carbon dioxide is discharged (line 65). The ashes from asphalt are discharged through line 66.

From 100 t/h of asphalt, are produced:

```
58.5 t/h of CH₄
 4.2 t/h of C₂H₄
13.2 t/h of B.T.X. (comprising 90% of benzene)
      and by-products, mainly CO₂, CO, H₂O, H₂S and ashes.
```
BTX = benzene, toluene, xylene.

(3)

Example of gasoline and gas manufacture by coking of a vacuum residue

The vacuum residue to be treated is obtained from a heavy crude oil whose physico-chemical properties are:
Initial distillation point: 500° C.
Conradson carbon: 22% by weight
Specific gravity at 15° C.: 1.02
Sulfur content: 2.9% by weight.

In the embodiment of FIG. 4, the vacuum residue is introduced through line 70 into the coking reactor 71. This reactor is also fed from line 72 with the heavy fraction (initial point 340° C.) separated in the treatment of the final effluent (separation steps 86), as well as coke particles at 1400° C. supplied through line 73 from furnace 74. The operating conditions are: an average temperature of 950° C., a pressure of 0.2 MPa, a residence time in zone A of the reactor of 50 ms and, in zone B, of 100 ms. The coke is heated in the furnace 74, for example, by combustion of the vacuum residue itself, fed through line 75. Air is admitted through line 76. The effluent of reactor 71 is supplied, through line 77, to cyclone 78 for separating the larger solid particles. A portion of the latter is fed through line 79 to furnace 74 for being heated therein and used thereafter as heat carrier in reactor 71.

The other portion in excess is discharged through line 80 and may be used elsewhere in the refinery, for example for the manufacture of steam or hydrogen by oxyvapogasification.

The gas and the finest solid particles are fed through line 81 to a second cyclone 82 after being cooled by a recycled portion of cold gas issued from the separation steps (line 83).

Gas (line 84) and very fine solid particles (line 85), comprising carbonaceous materials and ashes of the vacuum residue, are thus separated.

The produced gases discharged from line 84 are fractionated and purified in a known manner in the separation stages (86).

The following yields are obtained:

```
Gas C₁-C₃    10% by weight
Cut C₄        8% by weight
Gasoline     32% by weight
Gas-oil      27% by weight
Coke         23% by weight
            100
```

A heavy charge is thus treated with yields to light products (gasoline—gas oil) close to those produced by catalytic cracking of a distillate. The higher coke content is due to the high asphaltene content of the considered residue.

Comparative example (3')

This example makes use of the same reactor as in example 3. However, the direction of the nozzles for injecting the charge is so modified that the charge jets are no longer parallel to the dropping curtains of heat carrier solid particles, but are, on the contrary, brought into contact with the coke particles after about 10 milliseconds, i.e. after a travel substantially equivalent to one fifth of the length of portion A of the reactor.

The same vacuum residue is treated under conditions identical to those described in example 3, everything else being unchanged (rate of introduction of the charge, flow rate and temperature of the solid heat carrier).

The residence time of the charge in the pyrolysis chamber A is always equal to 50 milliseconds, and in zone B to 100 milliseconds.

The produced gases are purified in the same manner as precedingly and the following yields are obtained, as percent by weight with respect to the charge:
C₁-C₃ gas: 9.5%
C₄ cut: 7%
Gasoline: 30%
Gas-oil: 23.5%
Coke and tars: 30%

From the comparison of these results with those obtained in example 3, it appears that the obtained yields are lower, essentially as concerns the gas-oil fraction and the gasoline fraction, and the coke and tar production has been noticeably increased.

Moreover, a clogging of the reactor is observed after 1.5 hour of operation, said clogging resulting, very likely, from the agglomeration of coke heat carrier particles by the liquefied but unvaporized charge.

What is claimed is:

1. A process for thermal treatment of liquid or semi-liquid hydrocarbon charges for conversion to lighter hydrocarbons, the process comprising:
(a) introducing the liquid or semi-liquid hydrocarbon charge into a pyrolysis chamber as a plurality of downwardly directed jets of droplets, introducing hot solid particles of a heat carrying material into the same pyrolysis chamber in a direction parallel to the jets of droplets without substantial contact therebetween at least in the upper portion of the chamber, the temperature and flowrate of the heat carrying material particles being adjusted to obtain an average temperature of about 700°-1200° C. in the upper part of the chamber, the hydrocarbon material in the upper part of the chamber wherein substantially no contact with the heat carrying material occurs being heated primarily by radiation, for a residence time sufficient to raise the temperature of the hydrocarbon material from an inlet temperature of about 300°-400° C. to at least 700° C., and said residence time of heat transfer primarily by radiation being sufficient to avoid agglomeration of the solid particles which would otherwise occur by contacting the droplets and hot solid particles during that time, maintaining the introduced hydrocarbon charge for a residence time in the remaining portion of the chamber, with substantial contact occurring with the heat carrying material at about 700°-1200° C. and for a residence time of about 20-480 milliseconds, and introducing one of a reacting and a non-reacting gas, with at least one of the liquid jets and solid particles to maintain a pressure in the chamber of about atmospheric pressure—150 bar;
(b) withdrawing an effluent from the chamber of step (a) and separating the effluent into a fraction of solid particles and a gaseous fraction without substantial cooling of the effluent occurring;
(c) heating at least a part of the separated fraction of solid particles and recycling it to step (a) as heat carrying material; and
(d) cooling the separated gaseous fraction, containing hydrocarbons, with a cold gas which is identical to or different from the gas introduced to pressurize the chamber.

2. A process according to claim 1, wherein, during the step (b), only resultant solid particles having a relatively large particle size of at least 25 μm are separated for being fed to step (c), the gaseous fraction containing hydrocarbons and solid particles of relative small size of less than 25 μm is subjected to step (d), and after step (d), the gaseous fraction is separated from said solid particles of relatively small size.

3. A process according to claim 1, wherein the hydrocarbon charge is:
light or middle hydrocarbon fractions from the category of naphtha and gas-oil, either issuing from a straight-run distillation of crude oils or from the conversion of heavier hydrocarbons,
hydrocarbon heavy oils issued from the extraction of bituminous shales or asphaltic sands,
very heavy and very viscous crude oils with a high proportion of at least one of "asphaltenes", "resins" and metals,
heavy distillation residues of oil products,
asphalts obtained by deasphalting vacuum residues,
heavy residues obtained by conversion of petroleum products, or
hydrocarbon by-products obtained in the coal, oil and gas industries, including asphalts, pitches.

4. A process according to claim 1, wherein the charge in a naphtha or gas-oil fraction and at least a major portion of the gas consists of steam, so as to effect a steam-cracking for producing light olefins.

5. A process according to claim 4, conducted under the following operating conditions, adapted for steam-cracking operation:
average temperature from 1100° to 1200° C. obtained in 1 to 50 ms, pressure from 0.1 to 0.2 MPa, steam proportion from 0.3 to 1 part per part of charge to be treated.

6. A process according to claim 1, wherein at least a major part of the gas consists of hydrogen or a $CO+H_2$ mixture, for obtaining methanation or producing light hydrocarbons.

7. A process according to claim 6, conducted under the following operating conditions, adapted to hydropyrolysis: average temperature from 800° to 1000° C. obtained from 3 to 10 ms and pressure from 50 to 100 bars.

8. A process according to claim 1, wherein the gas injected in the reaction chamber is an inert gas for effecting pyrolysis.

9. A process according to claim 8, conducted under the following operating conditions, adapted to pyrolysis reaction: temperature from 900° to 1000° C. obtained in 20 to 80 ms and pressure from 0.15 to 0.2 MPa.

10. A process according to claim 2 wherein the relatively large particles separated have a size of about 50–100 μm and the relatively small particles separated have a size of about 5–15 μm.

11. A process according to claim 10 wherein the size of the droplets in the jets of liquid or semi-liquid hydrocarbons introduced is about 20 μm.

12. A process according to claim 1 wherein the heat carrying material comprises particles having a temperature of 1000°–1600° C.

13. The process according to claim 1, wherein said residence time of heat transfer primarily by radiation is about 1–50 milliseconds.

* * * * *